2,860,995

MEAT PROCESSING COMPOUND

Louis Sair, Evergreen Park, Ill., assignor to The Griffith Laboratories, Inc., Chicago, Ill., a corporation of Illinois No Drawing. Application April 15, 1958
Serial No. 728,558

10 Claims. (Cl. 99—222)

The present invention relates generally to compositions especially useful in various processes of treating raw meat for producing edible products, and in particular to compositions for addition to meat in the curing process.

In the preparation of foods on a large scale, numerous agents are employed. It is common practice to add prepared compositions containing at least two such agents. Such compositions are frequently salable merchandise made at one location, shipped and stored, to serve as a supply upon which a processor draws from time to time. An important illustration of such practice is in the processing of meat, as in preparing fresh meat products and cured meat products.

In such processing of meat it is now common to employ an ascorbic acid or a water-soluble salt of ascorbic acid, of which alkali metal salts and calcium salts are well-known for the purpose. Such an ascorbate radical has valuable functions with respect to the color of meat, deriving from its action as a reducing agent, or its antioxidant property. However, its advantages are not limited to use in meat. Frequently, it functions as an antioxidant in compositions of the type contemplated by the present invention, as for example, when it is present with essential oils and spices or ground natural spices.

In the curing of meat with curing agents including initially a nitrite salt, usually of alkali metal, it is known that ascorbic acid and its edible salts enter into chemical reaction with the meat constituents and the reaction products thereof with nitrous acid from the nitrite salt, to give improved and more stable color. It is also known that d-isoascorbic acid and its edible salts function in the same way and substantially to the same extent.

Small amounts of any one of these isomeric ascorbic acids and their salts are effective in the various field of use, and particularly with meat, and it is therefore a desirable practice to distribute the needed amount thereof in a larger amount of edible carrier. The carrier may be any one or more of the numerous materials used in processing foods. Because the largest field of use of the compositions of the present invention is in the treatment of meat, wherein cured meat products predominate over fresh meat products, the carriers herein described are those which may be used in nitrite-curing procedures.

Curing salt compositions, usually of sodium chloride, and nitrogen-containing curing salt, such as alkali metal nitrite alone or with alkali metal nitrate, are well established for addition to meat in curing processes. Other agents are employed, such as spices, sugars, especially corn-sugar, starch or other water-binding colloids, and these are commonly compounded into one or more mixtures to be used.

Difficulties have been encountered in the advance preparation of mixtures containing both nitrite-curing salt and an ascorbic acid or its water-soluble salt. Such mixtures deteriorate in time with loss of both nitrite and ascorbic value. Accordingly, nitrite-curing salt is excluded from compositions of the present invention.

In preparing such compositions of edible carrier as a vehicle for an ascorbic agent for meat curing, it has been found that ascorbic acid and its salts are subject to deterioration under commercial conditions of prolonged exposure at temperatures upwardly from 80° F. These conditions are encountered in commerce. It is current practice for manufacturers to compound various compositions for meat-processing for sale to meat packers and especially to the many small concerns engaged in the manufacture of fresh and cured ground-meat products. Such compositions commonly contain seasoning agents, such as spices. These prepared compositions must be stable in their effective agents under commercial conditions for periods of several months from manufacture to complete consumption of a single order thereof. It has been found that high temperatures of summer storage, and especially the higher temperatures encountered in trucking or shipping in summer, lead to undesirable loss of ascorbic acid values when this is provided as l-ascorbic acid or its edible salts. It has also been found that under the same conditions d-isoascorbic acid and its edible salts are far more stable.

Accordingly, it is an object of the present invention to provide solid compositions having commercially stable ascorbic value.

It is a particular object to provide solid seasoning compositions having stable ascorbic value.

Various other and ancillary objects and advantages of the present invention will appear from the following description and explanation.

The difficulty encountered in making solid curing compositions containing nitrite salt and an ascorbic acid or a salt thereof, such as a sodium ascorbate, arises from the acidity of the ascorbic material. The acidity effects release of nitrous acid and the nitrous acid effects loss of ascorbic values. Thus, such compositions are unstable in both nitrite and ascorbic content. Although it is known how such mixtures may be stabilized, it is preferred in the meat-curing art to provide nitrite-containing curing compositions free from auxiliary agents, commonly excepting sodium chloride and sodium nitrate. As a result, it is commercial procedure to employ along with the nitrite-containing curing composition other ingredients for the process, as separate entities or as one or more compositions. Such compositions are compounded for use in fresh meat processing as well as in curing.

Among these ingredients are sodium chloride, usually added to supplement the sodium chloride which may be contained in a nitrite-containing curing composition for brine curing, for dry-salt curing, and for ground-meat curing. In ground-meat processing, there is a large number of auxiliary ingredients so employed, such as seasonings including sugar, spices as oils or oleoresins or as ground spice, binders and fillers, of which some perform several functions. Although such supplementary edible ingredients include: sodium chloride, flours, starches, gums such as karaya, cane sugar, corn sugar, milk powder, sodium caseinate, ground spices, gelatine, so-called "dry-syrup" as the solids of the incomplete hydrolysis of starch having a D. E. in the range from 24 to 55, all of these and others may be used alone or in combination as a vehicle or carrier for d-isoascorbic acid and its edible salts for the present invention. All of these ingredients useful as a carrier or as part of a carrier are non-essential for the nitrite-curing process. In designating them as non-essential, it is not intended to indicate that they do not or must not function in the curing process. For example, it is well-known that corn sugar, which is dextrose, and starch hydrolysates having a dextrose equivalent (D. E.) do perform a function as reducing agents.

In my prior applications Serial No. 270,110, filed February 5, 1952, and Serial No. 467,883, filed November 9, 1954, as a continuation-in-part of Serial No. 270,110, of which two applications the present invention is a continuation-in-part, there are described solid seasoning compositions containing spice extractives including oils and oleoresins, on various edible carriers, including sodium chloride, milk powder, cane sugar, dry syrup, and flour, and also containing d-isoascorbic acid. In such compositions, the d-isoascorbic acid functions as antioxidant to stabilize the spice values, and the composition itself functions to season meats and to provide ascorbic values for the nitrite-curing of the so-seasoned meat.

The present invention pertains to the stability of those compositions in commercial use thereof with respect to the ascorbic content. It also enlarges the field in which to provide compositions for meat-processing to provide ascorbic value, and especially for nitrite-curing.

In a series of tests, a number of single vehicles containing the free ascorbic acids, or the sodium salts thereof were heated at 100° F. for three weeks, to determine the change in potency of the ascorbic content, as reported in Tables I and II below:

TABLE I

| Test No. | Vehicle [1] | Percent l-ascorbic | | Percent d-isoascorbic | |
|---|---|---|---|---|---|
| | | Original | Final | Original | Final |
| 1 | Wheat Flour [2] | 1.0 | 0.58 | 1.05 | 0.94 |
| 2 | Sodium Caseinate [2] | 1.6 | 0.9 | 1.4 | 1.1 |
| 3 | Ground Black Pepper [2] | 1.0 | 0.45 | 1.4 | 1.1 |
| 4 | Sodium Chloride [3] | 2.8 | 1.6 | 3.4 | 2.6 |
| 5 | Ground Black Pepper [3] | 3.5 | 2.2 | 3.6 | 3.2 |

[1] The vehicle included 1% of propylene glycol in order to insure a more uniform moisture content.
[2] Free acid.
[3] Sodium salt of the acid.

TABLE II

| Test No. | Percent of Ascorbic Isomer Lost | |
|---|---|---|
| | l-ascorbic | d-isoascorbic |
| 1 | 42 | 10.5 |
| 2 | 43 | 21.4 |
| 3 | 55 | 21.4 |
| 4 | 43 | 23.5 |
| 5 | 37.2 | 11.1 |

From the foregoing, it is apparent that the character of the vehicle is a factor in the decomposition. Because only single ingredients are the vehicle of the foregoing tests, it may be stated that such vehicles vary in the effects which induce decomposition, and that in each case the l-ascorbic material as free acid or as its water-soluble salt is more subject to deterioration than the free d-isoascorbic acid and its sodium salt.

In determining the relative stability of l-ascorbic acid and d-isoascorbic acid in a solid seasoning compound containing spice ingredients, comparative specimens have been made differing only in the said two materials as free acid or as salts, and such specimens have been aged at chosen temperatures. Then the contents of the two ascorbic acid isomers have been determined. It has been found that in solid compositions containing in addition to the vehicle spice values only as spice extracts such as the essential oils and oleoresins, and in solid compositions containing in addition to the vehicle spice values only as ground spices, the l-ascorbic acid content is reduced at a much faster rate than the content of d-isoascorbic acid, both as the free acids and as their sodium salts.

*Comparison A.*—The following bologna seasoning composition has been tested:

| | | |
|---|---|---|
| Corn sugar | pounds | 61.3 |
| Fine flake sodium chloride | do | 21 |
| Ascorbic acid isomer | do | 2.7 |
| Spanish paprika | do | 15 |
| Mixed oils of clove, nutmeg and coriander | ounces | 11.5 |
| Mixed oleoresins of ginger, paprika and capsicum | ounces | 14 |

Table III shows the content of the ascorbic acid isomer after a period of storage up to 40 days at two different temperatures:

TABLE III

| Days Storage | Percent of Ascorbic Acid Isomer | | | |
|---|---|---|---|---|
| | l-ascorbic | | d-isoascorbic | |
| | 80° F. | 100° F. | 80° F. | 100° F. |
| 0 | 2.69 | 2.69 | 2.69 | 2.69 |
| 24 | 2.40 | 1.73 | 2.50 | 2.58 |
| 40 | 2.25 | 1.25 | 2.60 | 2.25 |
| 40-day loss in percent | 16.3 | 54 | 3.3 | 16.3 |

*Comparison B.*—A frankfurter seasoning composition was prepared as follows:

| | | |
|---|---|---|
| Fine flake sodium chloride | pounds | 97.5 |
| Sodium salt of ascorbic acid isomer (calculated as acid) | pounds | 2.65 |
| Mixed oils of clove, nutmeg and coriander | ounces | 12 |
| Mixed oleoresins of ginger, paprika and capsicum | ounces | 20 |

This composition was aged for 40 days and during the aging the ascorbic acid content was determined as shown in Table IV.

TABLE IV

| Days Storage | Percent of Ascorbic Acid Isomer | | | |
|---|---|---|---|---|
| | l-ascorbic | | d-isoascorbic | |
| | 85° F. | 100° F. | 85° F. | 100° F. |
| 0 | 2.65 | 2.65 | 2.63 | 2.63 |
| 5 | | 2.45 | | 2.45 |
| 20 | 2.60 | 1.70 | 2.65 | 2.53 |
| 40 | 2.01 | 0.40 | 2.40 | 2.08 |
| 40-day loss in percent | 24.1 | 85 | 7.9 | 21.8 |

*Comparison C.*—Several solid seasoning compositions were prepared as follows:

| | Pounds |
|---|---|
| Fine flake sodium chloride | 72 |
| Sodium salt of ascorbic acid isomer (calculated as acid) | 3 |
| A ground spice | 25 |

Five variations of the above formula were made in which the single spices were those designated in Table V, below. The compositions having initially 3% of ascorbic acid isomer were aged for three months at 85° C. and the ascorbic acid determined after such aging, is shown in Table V.

TABLE V

| Spice | Percent Ascorbic Acid Isomer Retained | | Percent Loss | |
| --- | --- | --- | --- | --- |
| | l-ascorbic | d-isoascorbic | l-ascorbic | d-isoascorbic |
| Black Pepper | 2.55 | 2.95 | 15. | 1.66 |
| Caraway | 2.38 | 2.90 | 20.6 | 3.3 |
| Ginger | 2.56 | 3.00 | 15. | 0 |
| Paprika | 2.30 | 2.95 | 23.3 | 1.66 |
| Anise | 2.40 | 2.91 | 20 | 3.0 |

In each of the above comparisons, it is shown that l-ascorbic acid and its salt are far more unstable in the presence of spices, whether ground or extracted, than the d-isoascorbic acid and its salt. It is immaterial whether the ascorbic acid isomer is present as the free acid or as its sodium salt. Therefore, the present invention is based upon the discovery evidenced above that the d-isoascorbic acid not only stabilizes spice ingredients, but it is also stabilized by the spices so that its use in a solid seasoning composition preserves both the spices and the d-isoascorbic acid or salt for functioning in any processing in which the seasoning composition is employed.

In the following examples, where d-isoascorbic acid or its salt is named as an ingredient, it may be considered as added entirely as a solid or in whole or in part as an aqueous solution in an equal amount of water, to provide water for the composition, as is sometimes required in compounding. Examples 1 through 5 are used at 8 ounces per 100 pounds of meat.

Example 1.—Dry solid seasoning

| | | |
| --- | --- | --- |
| Oleoresin of ginger | cc | .5 |
| Oleoresin of mace | cc | .75 |
| Oil of nutmeg | cc | .75 |
| Oil of coriander | cc | 1.25 |
| Oil of cardamon | cc | .25 |
| Oleoresin of capsicum | cc | 3.00 |
| Ground white pepper | oz | 3.00 |
| Sodium chloride | oz | 4.5 |
| D-isoascorbic acid | oz | .5 |

Example 2.—Liver sausage

| | Parts by weight |
| --- | --- |
| Sodium chloride | 256 |
| Glycerine | 3.0 |
| Oleoresin of capsicum | 3.5 |
| Oleoresin of ginger | .14 |
| Essential oils of spices | 12 |
| D-isoascorbic acid | 30 |
| Total | 305 |

Example 3

| | Parts by weight |
| --- | --- |
| Sodium chloride | 46.0 |
| Milk powder | 46.0 |
| Glycerine | 1.25 |
| Oleoresin of capsicum | 3.00 |
| Essential oils of spice | 2.00 |
| D-isoascorbic acid | 1.5 |
| Total | 99.30 |

Example 4

| | Parts by weight |
| --- | --- |
| Powdered can sugar | 357 |
| Corn oil | 4 |
| Glycerine | 4 |
| Essential oils of spice | 10 |
| D-isoascorbic acid | 25 |
| Total | 400 |

Example 5

| | Parts (as given) | |
| --- | --- | --- |
| Corn sugar | ounces | 8 |
| Oil of nutmeg | cc | 3 |
| Oleoresin of capsicum | cc | 2 |
| Oil of coriander | cc | 1 |
| Oleoresin of ginger | cc | ¼ |
| Oil of clove | cc | ¼ |
| D-isoascorbic acid (50% solution) | cc | 2 |
| D-isoascorbic acid (dry) | grams | 2.5 |

Example 6

| | Parts by weight |
| --- | --- |
| Dry syrup [1] | 95 |
| Corn oil | 3 |
| Oleoresin of capsicum | .75 |
| Essential oils of spices | .5 |
| D-isoascorbic acid | .2 |
| Total | 99.45 |

[1] Dried acid-hydrolysate of starch having dextrose equivalent in range from 24 to 55.

Example 7

| | Parts by weight |
| --- | --- |
| Sodium chloride | 113 |
| Flour | 113 |
| Glycerine | 3 |
| Oleoresin of capsicum | .9 |
| Oleoresin of ginger | .03 |
| Essential oils of spice | 4 |
| D-isoascorbic acid | 6 |
| Total | 240 |

Example 8

| | Parts by weight |
| --- | --- |
| Sodium chloride | 212 |
| Glycerine | 3.0 |
| Oleoresin capsicum | 7.0 |
| Oleoresin ginger | .28 |
| Essential oils of spices | 18 |
| Sodium isoascorbic | 60 |
| Total | 300 |

The above is especially compounded for use at 4 ounces per 100 pounds of liver sausage mix.

It is known that solid seasoning compositions containing sodium chloride in the carrier, and containing oleoresin of capsicum, exhibit a color change or a bleaching of the capsicum color, unless inhibited as described in U. S. Patents No. 1,995,119, No. 1,995,120, No. 1,995,121, and No. 2,032,612. When d-isoascorbic acid or its sodium salt is present, the desired inhibition is provided by the antioxidant property of the d-isoascorbic acid.

In nitrite-curing of meat with ascorbic acid or with d-isoascorbic acid as their free acids or their water-soluble salts, the quantity thereof calculated as free acid may vary upwardly from 1/16 ounce to 100 pounds of meat (including fat and lean). The preferred and practical quantity is in the range from ⅜ to ¾ ounces per 100 pounds of meat, with ½ ounce being a practical standardized formulation.

Because many solid compositions used in meat-curing are so fixed in composition that they may be variously used in an amount in the range, for example, from 4 ounces to 2 pounds per 100 pounds of meat, the usage varies with the nature of the additive. Let $x$ = ounces of composition used per 100 lbs. of meat
$y$ = ounces of d-isoascorbic acid value in 1 lb. of composition
$z$ = usage in ounces of ascorbic acid value in 100 lbs. of meat Then $xy = 16$ ozs.

The broad range for $z$ is 1/16 to ¾. The following

Table VI indicates the character of compositions for these conditions.

TABLE VI

| Case | $x$ | $y$ | | |
|---|---|---|---|---|
| | | $z=1/16$ | $z=3/4$ | $z=3/8$ |
| a | 4 | .25 | 3 | 1.5 |
| b | 6 | .166 | 2 | 1 |
| c | 8 | .125 | 1.5 | .75 |
| d | 16 | .0625 | .75 | .375 |
| e | 32 | .0312 | .375 | .187 |

Example 8 falls within Case $a$. It contains 20% of sodium d-isoascorbate, which is equivalent to 17.7% of the free acid, or 2.84 ounces of free acid per pound of composition, thus introducing .71 ounce of ascorbic acid value per 100 pounds of meat.

For the lowest usage of the acid in meat ($z=1/16$) and the highest usage of the composition ($x=32$), the value of $y$ is .0312 ounce of the acid per pound of composition, which is 0.0195% or in round figures 0.2%. Therefore, for compositions useful in a range from 4 ounces to 2 pounds per 100 pounds of meat, the content of d-isoascorbic acid or its equivalent as a salt may vary in the range from 0.2% to 20%.

From the foregoing, it is apparent that ascorbic acid values for use in food processing, and especially in the nitrite-curing of meat may be provided in solid compositions, especially seasoning compositions rich in spice values, and when employed as free d-isoascorbic acid or as its edible water-soluble salts, the ascorbic value is more stable under commercial conditions than when provided as the free l-ascorbic acid or as its edible water-soluble salts.

The invention is not to be considered as limited to or by the exemplary compositions given hereinabove, and it is to be understood that numerous changes and other formulations are contemplated as falling within the scope of the appended claims.

This application is a continuation-in-part of my prior application Serial No. 467,883, filed November 9, 1954, now abandoned.

I claim:

1. A composition useful in treating meat and meat products, comprising a substantially dry homogeneous mixture containing from 0.2% to 20% by weight of material selected from the group consisting of di-isoascorbic acid and its edible salts, and as substantially all of the remainder a diluting edible carrier composition therefor suitable as an additive in the treating process, said carrier composition being non-essential for the nitrite-curing of meat.

2. A solid seasoning composition useful in curing meat and meat products consisting of a carrier of comminuted edible solid, said carrier being non-essential for the nitrite-curing process, and homogeneously mixed with and carried thereby spice material selected from the group consisting of ground natural spices, essential oils of spices and oleoresins of spices, and from 0.2% to 20% by weight of ascorbic material selected from the group consisting of d-isoascorbic acid and its edible salts.

3. A solid seasoning composition useful in treating meat and meat products, consisting of a carrier of comminuted edible water-soluble solid, said carrier being non-essential for the nitrite-curing process, and homogeneously mixed with and carried thereby spice material selected from the group consisting of ground natural spices, essential oils of spices and oleoresins of spices, and from 0.2% to 20% by weight of ascorbic material selected from the group consisting of d-isoascorbic acid and its edible salts.

4. A solid seasoning composition useful in treating meat and meat products, consisting of a carrier of comminuted edible solid including sodium chloride crystals, said carrier being non-essential for the nitrite-curing process, and homogeneously mixed with and carried thereby flavoring ingredients including oleoresin of capsicum, and from 0.2% to 20% by weight of ascorbic material selected from the group consisting of d-isoascorbic acid and its edible salts.

5. A solid seasoning composition useful in treating meat and meat products, consisting of a carrier of comminuted edible solid including sodium chloride crystals, said carrier being non-essential for the nitrite-curing process, and homogeneously mixed with and carried thereby oleoresin of capsicum and other spice material selected from the group consisting of ground natural spices, essential oils of spices and oleoresins of spices, and from 0.2% to 20% by weight of ascorbic material selected from the group consisting of d-isoascorbic acid and its edible salts.

6. A solid seasoning composition useful in treating meat and meat products, consisting of a carrier of comminuted edible solid, said carrier being non-essential for the nitrite-curing process, and homogeneously mixed with and carried thereby flavoring material, and from 0.2% to 20% by weight of ascorbic material selected from the group consisting of d-isoascorbic acid and its edible salts.

7. A solid seasoning composition useful in treating meat and meat products, consisting of a carrier of comminuted edible water-soluble solid, said carrier being non-essential for the nitrite-curing process, and homogeneously mixed with and carried thereby flavoring extract and from 0.2% to 20% by weight of ascorbic material selected from the group consisting of d-isoascorbic acid and its edible salts.

8. A solid seasoning composition useful in treating meat and meat products consisting of a carrier of comminuted edible solid including sodium chloride crystals, said carrier being non-essential for the nitrite-curing process, and homogeneously mixed with and carried thereby flavoring extract including oleoresin of capsicum and other flavoring material selected from the group consisting of essential oils of flavoring material and oleoresins of spices, and from 0.2% to 20% by weight of ascorbic material selected from the group consisting of d-isoascorbic acid and its edible water-soluble salts.

9. A solid seasoning composition useful in treating meat and meat products consisting of a carrier of comminuted edible solid including sodium chloride crystals, said carrier being non-essential for the nitrite-curing process, and homogeneously mixed with and carried thereby flavoring ingredients including oleoresin of capsicum and other spice material selected from the group consisting of ground natural spices, essential oils of spices and oleoresins of spices, and from 0.2% to 20% by weight of material selected from the group consisting of d-isoascorbic acid and its edible water-soluble salts.

10. A solid seasoning composition useful in treating meat and meat products consisting of a carrier of comminuted edible solid including sodium chloride crystals, said carrier being non-essential for the nitrite-curing process, and homogeneously mixed with and carried thereby oleoresin of capsicum, and from 0.2% to 20% by weight of material selected from the group consisting of d-isoascorbic acid and its edible water-soluble salts.

References Cited in the file of this patent

UNITED STATES PATENTS

| | | |
|---|---|---|
| 2,032,612 | Griffith et al. | Mar. 3, 1936 |
| 2,054,624 | Griffith | Sept. 15, 1936 |
| 2,368,435 | Wells et al. | Jan. 30, 1945 |
| 2,553,533 | Komarik et al. | May 15, 1951 |
| 2,739,899 | Hollenbeck | Mar. 27, 1956 |
| 2,788,278 | Zimont et al. | Apr. 9, 1957 |

UNITED STATES PATENT OFFICE

CERTIFICATE OF CORRECTION

Patent No. 2,860,995

November 18, 1958

Louis Sair

It is hereby certified that error appears in the printed specification of the above numbered patent requiring correction and that the said Letters Patent should read as corrected below.

Column 6, line 74, for "16 ozs." read -- 16z --; column 7, line 22, for "0.0195%" read -- 0.195% --; lines 48 and 49, for "di-isoascorbic" read -- d-isoascorbic --.

Signed and sealed this 17th day of March 1959.

(SEAL)

Attest:

KARL H. AXLINE
Attesting Officer

ROBERT C. WATSON
Commissioner of Patents